US007624896B2

(12) United States Patent
Doglioni Majer

(10) Patent No.: US 7,624,896 B2
(45) Date of Patent: Dec. 1, 2009

(54) LIQUID SUPPLYING APPARATUS FOR VENDING MACHINE

(75) Inventor: Andrea Doglioni Majer, Milan (IT)

(73) Assignee: Rhea Vendors S.p.A., Como (IT)

( * ) Notice: Subject to any disclaimer, the term of this patent is extended or adjusted under 35 U.S.C. 154(b) by 512 days.

(21) Appl. No.: 10/535,107

(22) PCT Filed: Nov. 15, 2002

(86) PCT No.: PCT/IT02/00725

§ 371 (c)(1),
(2), (4) Date: Jan. 17, 2006

(87) PCT Pub. No.: WO2004/045351

PCT Pub. Date: Jun. 3, 2004

(65) Prior Publication Data
US 2006/0151532 A1 Jul. 13, 2006

(51) Int. Cl.
*B67D 5/62* (2006.01)
(52) U.S. Cl. .................... 222/146.2; 415/911; 417/315; 417/410.1; 417/423.5; 417/424.1; 222/146.5; 222/252; 222/265; 222/271; 222/278
(58) Field of Classification Search ............. 222/129.1, 222/146.2, 146.5–146.6, 252, 255, 264–265, 222/271–274, 278, 410; 417/315, 321, 410.1, 417/423.1, 423.5, 424.1; 415/911
See application file for complete search history.

(56) References Cited

U.S. PATENT DOCUMENTS

| 3,614,275 A | * | 10/1971 | Eibsen | ..................... 418/206.1 |
| 3,773,432 A | * | 11/1973 | Chow et al. | ................... 415/206 |
| 4,094,446 A | * | 6/1978 | Brutsman | ................. 222/146.5 |
| 4,331,295 A | * | 5/1982 | Warihashi | ................ 239/284.1 |
| 4,396,353 A | * | 8/1983 | MacDonald | ................. 417/36 |
| 4,728,260 A | * | 3/1988 | Ishii | ........................... 415/151 |
| 4,869,076 A | * | 9/1989 | Sakai et al. | .................... 62/347 |
| 4,874,298 A | * | 10/1989 | Mainardi et al. | ............ 417/315 |
| 4,900,235 A | * | 2/1990 | Perkins et al. | ............... 417/315 |
| 5,265,518 A | * | 11/1993 | Reese et al. | .................... 99/280 |
| 5,486,089 A | * | 1/1996 | Chung | ......................... 415/146 |
| 5,759,604 A | * | 6/1998 | Bottlinger et al. | ........... 426/433 |
| 5,793,294 A | * | 8/1998 | Schepka | ...................... 340/616 |
| 6,082,247 A | * | 7/2000 | Beaulicu | ................... 99/302 R |
| 6,149,390 A | * | 11/2000 | Fisher et al. | ................... 417/40 |
| 6,366,053 B1 | * | 4/2002 | Belehradek | ................. 320/128 |

FOREIGN PATENT DOCUMENTS

| EP | 0540440 | 5/1993 |
| EP | 1106126 | 6/2001 |
| EP | 1210893 | 6/2002 |
| WO | WO 0176429 | 10/2001 |

* cited by examiner

*Primary Examiner*—Frederick C. Nicolas
*Assistant Examiner*—Andrew P Bainbridge
(74) *Attorney, Agent, or Firm*—Millen, White, Zelano & Branigan, P.C.

(57) ABSTRACT

The present invention relates to a device for supplying liquids comprising heating elements (3) heating up said liquids and an electric drive pumping group (101). The characteristic is that the pumping group (101) comprises an intake (102) and at least a first and second intake duct (8a-8b, 8c-8d, 8e-8f), and is further equipped with an impeller (11a, . . . , 11c), said first and second intake duct (8a-8b, 8c-8d, 8e-8f) being selectively activated according to the direction of rotation of said impeller (11a, . . . , 11c) of the pumping group (4a, . . . , 4c).

15 Claims, 5 Drawing Sheets

LIQUID SUPPLYING APPARATUS FOR VENDING MACHINE

The present invention relates to a device for supplying and heating up liquids, water for instance, in vending machines according to the pre-characterizing portion of claim 1.

It is known that a vending machine supplying hot chocolate, milk and tea, broth and/or many kind of drink that has to be served hot, has to be equipped with a tank from which a system consisting of pumps, heating elements, electric valves and mixing devices can take, heat up, supply and mix the product to be served to the consumer.

Manufacturers of vending machines, have proposed various systems with such features, which can ensure both a correct and constant flow rate and temperature of the product contained in the tank and a correct supply of the product to the consumer.

For instance, some of said manufacturers of vending machines have provided one or more tanks placed in the upper portion of the vending machine and containing for instance water or another liquid product.

Such tanks are provided with heating elements supplied with electric energy, which can heat up the content of said tanks to the convenient temperature.

In particular, placing the tanks in the upper portion of the vending machine allows to exploit the potential energy accumulated by water and to avoid the use of pumps to suck up water from the tank.

Indeed, said tanks are the starting point of intake pipes or ducts downstream from which there is only an electric valve selecting which mixing device has to be actuated according to the product chosen by the consumer.

That is to say, the mixing devices receive on one hand the heated-up content within the tank and on the other the product (or several products at the same time), so that these can be mixed and then supplied to the consumer.

In particular, water heated up by the heating element is mixed for instance with chocolate or milk or tea, by one of the mixing devices that are positioned beside or near a supply nozzle for the product to be served to the consumer.

Such technique, however, is disadvantageous because it requires quite long pipes or ducts connecting tank and mixing devices, thus resulting in long waiting times before the product comes out of the supply nozzle and, above all, once the supply operation is over, leaving the connecting pipe full of water, which leads to quite obvious consequences.

Other manufacturers of vending machines provide one or more tanks placed for instance in the lower portion of the vending machine, equipped with only one electric pump with an impeller under the level of water contained in the tank, and heating elements which can suitably heat up the product to be supplied.

Water heated, up and sucked up, through the pump impeller is led into an intake duct, which is then divided into a plurality of intake ducts arranged parallel one to the other by means of an electric valve. Said electric valve allows to shut alternatively, i.e. selectively, one or another of the intake ducts, since the latter lead to the mixing devices.

Such technique is indubitably, advantageous because the water tank can be placed anywhere within the vending machine, and moreover because the tank can be placed beside the mixing devices, so as to avoid long connecting ducts as well as the absence of water in the connecting duct after every supply operation.

Nevertheless, the presence of the electric valve in the supply system results in serious technical disadvantages and drawbacks.

Indeed, after being used several times, the electric valve shows an imperfect shutting due to the accumulation of limestone, high costs, a reduced reliability time and the possibility of managing a limited number of mixing or blending devices due to the low pressure that can be exerted by said electric valveThis results in a small number of drinks to be supplied to the consumer, who therefore has a limited choice of products.

However, should the manufacturer of vending machines want to increase the number of mixing devices, he would have to face—as was mentioned before—a lack of pressure to be exerted by the, electric valve, and should he simply increase the number of electric valves, this would result in an increase of, manufacturing costs that would hardly be competitive with respect to other manufacturers of vending machines.

Furthermore, the electric valve has stiff supply times deriving from the sum of activation, stop and safety times, thus resulting a great delay between consumer's request and actual drink supply, which therefore causes an inconvenience for the consumer.

Considering the state of the art as described above, the present invention aims at carrying out a device for supplying liquids without the problems related to the prior art.

In accordance with the present invention said aim is reached by means of a device for supplying liquids according to claim 1.

Thanks to the present invention it is possible to carry out a device for supplying liquids, such as water for instance, which can supply a greater number of mixing devices and with shorter supply times than supply devices of the prior art.

Moreover, the present invention results in a higher reliability of the supply device with respect to known systems.

The characteristics and advantages of the present invention will be evident from the following detailed description of one of its embodiments, shown as a mere non-limiting example in the enclosed drawings, in which.

Figure 1:
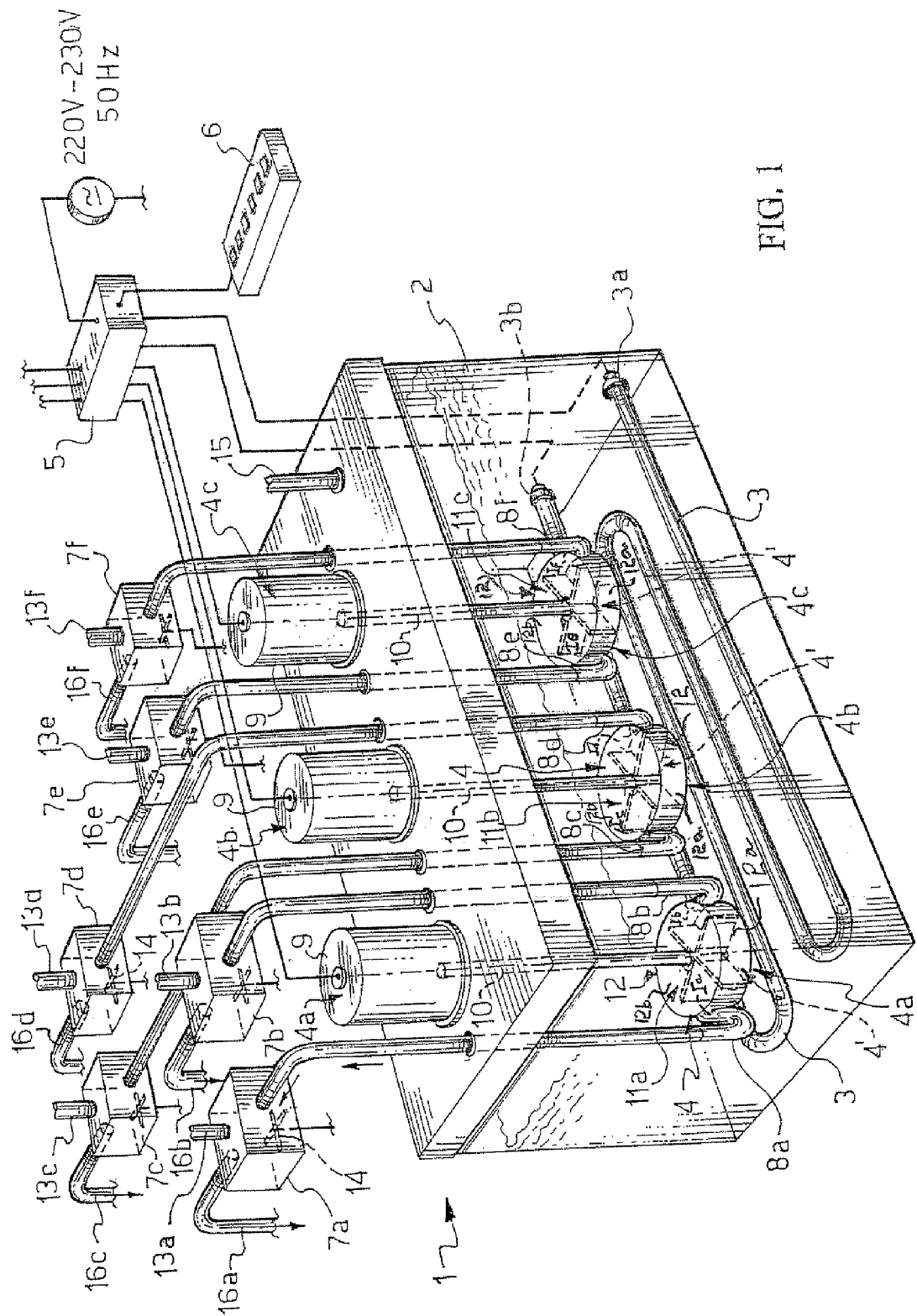
FIG. 1 shows a perspective view of the supply device according to the present invention.
Figure 2:
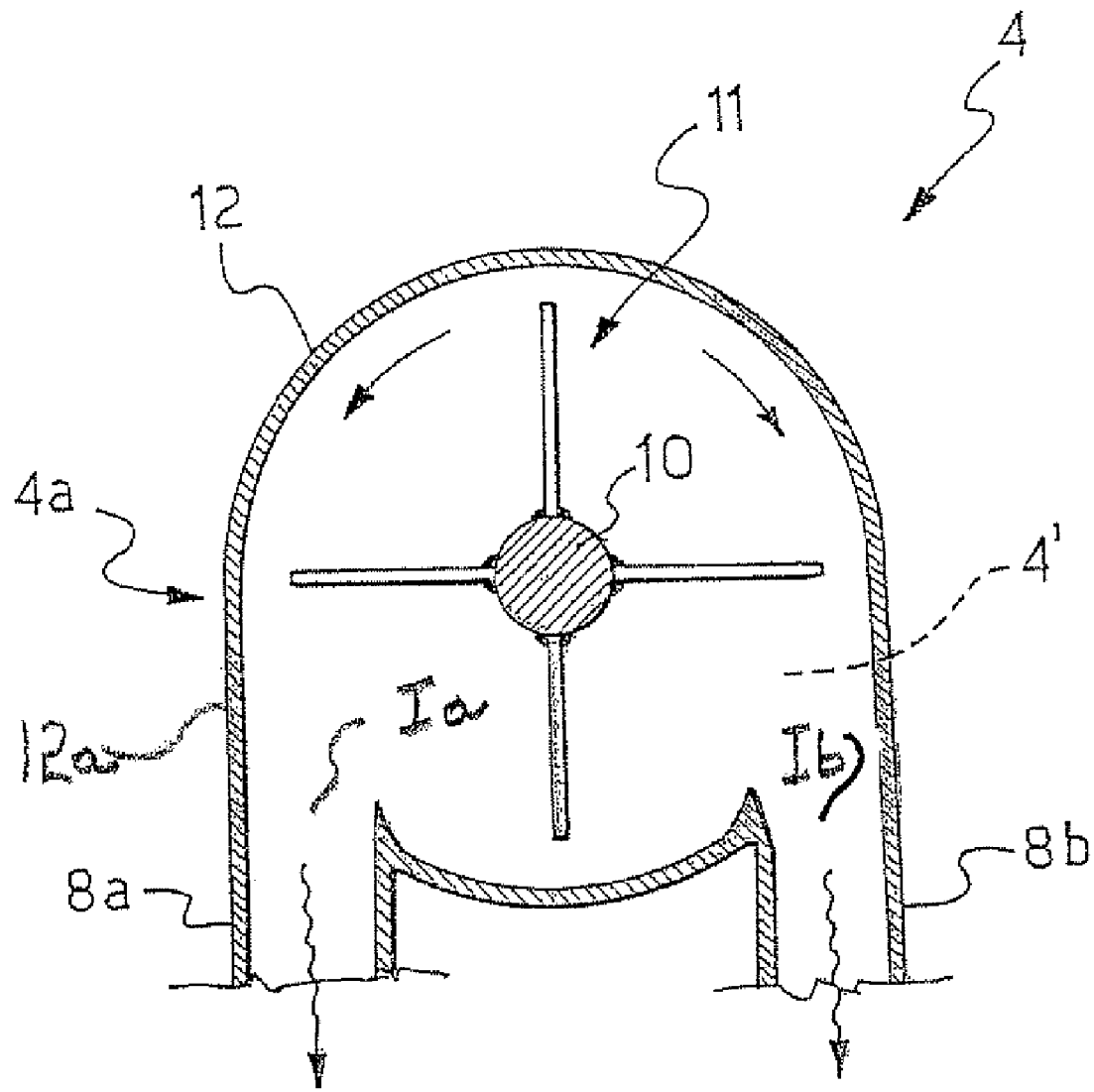
FIG. 2 shows an enlarged detail of the supply device of FIG. 1.

With reference to the enclosed FIGS. 1-2 the numeral 1 refers to the device according to the present invention equipped with a tank 2 containing liquid food, and heating elements 3 and a plurality of pumping groups 4 are arranged within said tank 2.

Each pumping group comprises respective pumps $4a, \ldots, 4c$, and said pumps $4a, \ldots, 4c$ as well as the heating elements 3 are directly connected to an electronic interface. Such electronic interface 5 is supplied by mains voltage, i.e. 220-230V and a frequency of 50 Hz.

In order to actuate the electric pumps $4a, \ldots, 4c$ it is provided for a control panel 6, which is connected directly to the electronic interface 5 and can be actuated by the consumer.

Each of the electric pumps $4a, \ldots, 4c$ is equipped with a pair of vertically extending outlet pipes or ducts $8a$-$8b$, $8c$-$8d$ and $8e$-$8f$ and each of said electric pumps $4a, \ldots, 4c$ is also in fluid connection with a plurality of mixing or blending devices $7a, \ldots, 7f$.

In particular, each of said mixing devices $7a, \ldots, 7f$ is in fluid connection with the electric pumps $4a, \ldots, 4c$ by means of at least a corresponding outlet duct $8a$-$8b$, $8c$-$8d$ and $8e$-$8f$.

Each of said electric pumps 4a, . . . , 4c consists of an electric motor 9 connected through motion transmission means 10 to an impeller or finned disc 11, said impeller being housed in a box-shaped shell 12, preferably a cylinder, or a stator.

Each shell 121 is the starting point of the outlet pipes or ducts 8a-8b, 8c-8d and 8e-8f, which can lead liquid food contained in the tank 2 to the corresponding mixing devices 7a, . . . , 7f.

Advantageously, said outlet ducts 8a-8b, 8c-8d and 8e-8f are arranged on the vertical tangent with oppositely oriented intakes Ia-Ib, Ic-Id and Ie-If.

In particular, the shaft of the electric motor 9 is connected in direct drive with the motion transmission means 10, which are in direct drive on the shaft of the rotor of said motor 9.

In an alternative embodiment it can be provided for a reduction gear box, which differentiates the rotation speed of the impeller with respect to the rotation speed of said motor 9.

The heating elements 3 are arranged near the bottom of the tank 2 and can heat up water or other liquids contained in said tank 2 according to the drink to be supplied.

Each of said mixing devices 7a, . . . , 7f is provided on its intake, beyond with at least an outlet duct 8a-8b, 8c-8d and 8e-8f, also with a supply duct 131a, . . . , 13f.

The supply ducts 13a, . . . , 13f can lead into the corresponding mixing device 7a, . . . , 7f products such as chocolate, milk, tea or broth, which are necessary for preparing the drink.

The mixing of water contained in the tank 2 and products led by the supply ducts 13a, . . . , 13f, therefore, takes place within said mixing devices 7a, . . . , 7f by means of a propeller or fan 14.

Also this fan 14 is supplied with electric energy directly by the electronic interface 5.

After the mixing step has taken place, each mixing device 7a, . . . , 7f supplies through its own outlet duct 16a, . . . , 16f the product to be served to the consumer.

As can be observed, also the tank 2 is equipped with an intake duct 15, which can supply said tank 2 with water or any other liquid or fluid substance to be heated up for the following preparation of the drink to be supplied.

As was already described, the heating elements 3 are placed near the bottom of the tank 2 and are armored heating elements with different power, coated with food-compatible anti-corrosion paints.

The heating element 3 is supplied with electric energy by the electronic interface 5 and is equipped with mains plugs 3a and 3b, so as to be easily removable from the body of the tank 2 to carry out fast maintenance operations.

Such heating elements are made of Silumin or, other aluminum alloys, of pyroceram or of Ni—Cr stainless steel or other non-magnetic stainless steels, which can turn electric energy into heat as efficiently as possible.

In particular, the heating element 3 should be provided with specific requirements, such as for instance electric safety, working safety and above, all sufficient heat capacity.

As far as electric safety is concerned, today thanks to the optimal choice of the three main components constituting the heating element 3 (i.e. sheath material, heating wire and oxide coating for heating wire) no specific problems arise, whereas as far as working safety is concerned, even in case of a highly simple heating element 3, the latter will hardly break down, thus ensuring a suitable life of the heating element in its use conditions.

Considering now heat capacity, different aspects have to be taken into consideration, not only the capacity of the tank 2, such as for instance the material of said tank 2, so that the actual power is of 1-2 KWatt.

The heating element 3 can also be connected directly to a device that can break the current flow when the content of the tank 2 reaches a given and desired threshold temperature.

Said device is a thermostatic switch (not shown in the figures), for instance a bi-metallic one, which exploits the extending or shortening feature of metals and according to the temperature can open or close, thus defining to which temperature this "elementary" relay should open or close the electric circuit.

In order to check that the circuit has actually been closed, the thermostatic switch is connected to a lamp or light (not shown in the figures), which turns on when the latter is on and turns off when it is off.

The thermostatic switch should be immersed in the water contained in the tank 2, connected to the mains and to the heating element 3 of the heater.

However, said bi-metallic thermostatic switch can also be incorporated into the heating element 3, thus forming the so-called thermo-heater or thermostatic switch heater.

Another type of thermostatic switch that is more reliable than the bi-metallic one is the electronic type, which exploits the sensitivity to temperature of some semiconductors immersed in water or applied out-side the tank 2 and connected to the electronic interface 5 by means of a small cable.

Temperature is adjusted by means of a potentiometer, whose main feature is the possibility of a gradual adjustment of the power of the heating element 3.

Indeed, this type of thermostatic switch does not fully break the flow of electric current, as, happens in case of bi-metallic thermostatic switches, but reduces the power of the heating element 3 as needed. When water temperature is only slightly lower than the desired value, said heating element 3 operates at a minimum power, but when said difference is more than for instance a preset temperature of 1° C., said heating element 3 operates at full capacity.

The working idea of such embodiments is managed by means of a micro-controller (not shown in the figures) included within the electronic interface 5.

Referring now to FIG. 2, it can be noticed that the impeller 11 is of the type equipped with blades, but other embodiments are possible, such as for instance with propeller, turbine or disc.

As can be seen from such FIG. 2, the outlet ducts 8a and 8b have intakes Ia and Ib, respectively, that are arranged tangentially with respect to the stator of the shell 12, thus ensuring that the fluid sucked up during a sense of rotation of the impeller 11 enters into only one outlet duct 8a or 8b. The shell 12 has a vertical curved side wall 12a which is preferably circular and a closed top wall 12b.

Obviously, the incidence angle of the intakes ducts 8a and 8b can also be different from the one shown in FIG. 2, but should anyhow be such as to preserve the feature according to which only one intake ducts can be selected during a sense of rotation of the impeller 11.

It should be observed that the aspects determining the effectiveness of the stirring induced by the impeller 11 are the power of the electric motor 9 and the shape of the impeller 11, which should therefore be chosen in accordance with the desired stirring.

The impeller 11 and the shell 12 therefore transmit to the fluid a motion with a tangential component oriented in, a first arid second direction according to the sense of rotation of said impeller. The first duct 8a is then activated only in a sense of rotation of the impeller 11, for instance clockwise, whereas the second duct 8b is activated only in the opposite sense of rotation of the impeller 11, for instance anti-clockwise.

In other words, the first intake duct 8a is oriented with respect to the shell 12 in a non-perpendicular direction, so as to receive the intake flow when the impeller 11a has a first sense of rotation, and said second intake duct 8b is oriented with respect to the shell 12 in a non-perpendicular direction so as to receive an intake flow when the impeller 11a has an opposite sense of rotation with respect to said first sense of rotation.

Referring now again to FIG. 2, it can be noticed how the contours 16 and 17 of the box-shaped body 12, for instance, of the electric pump 4a allow to activate the intake duct 8a when said impeller 7 turns clockwise, while the intake duct 8b is not working, and vice versa.

The outlet ducts 8a-8b, 8c-8d and 8e-8f are for instance made of a material such as neoprene, having an inner diameter of some tens of millimeters and enabling the flow of the substances contained in the tank 2 without modifying their organoleptic properties in a temperature range between zero° C. and one hundred §C.

The present embodiment uses centrifugal pumps whose impellers 11 are provided with simple blades, i.e. there is an impeller 11 equipped with four or six or also eight fins connected to the transmission means 10 so as to take the content of the tank 2.

In the example the transmission means 10 consist of a simple shaft turning synchronously with the electric motor 9.

The main feature of centrifugal electric pumps 4 is that they generate a low pressure and therefore have a flow rate of some tens of deciliters per minute with discharge heads of fifty or one hundred centimeters, and that they are highly efficient and fully silent.

The electric motor 9 is supplied with a constant voltage for instance of 24V, the mains voltage of 220-230V and 50 HZ having been transformed through suitable devices (not shown in the figures) arranged in the electronic interface 5.

The electric motor 9 is therefore a direct current (DC) electric motor equipped with an instantaneous switch which can reverse the direction of rotation of the electric motor 9, said switch being also arranged in the electronic interface 5.

It is also provided that the electronic interface 5 can also adjust the rotation speed of the impeller 11 through a microprocessor.

It is further provided that the electronic interface 5 can be equipped with feedback circuits (not shown in the figures), which can keep the speed of the impeller 7 constant when the viscosity of the content of the tank 2 changes, and with reference circuits (not shown in the figures), which can stabilize speed in case of oscillations in the mains current.

In particular, the stirring speed should be adjusted so as to avoid spray, foam and other drawbacks causing load losses and therefore a lower efficiency.

Figure 3:
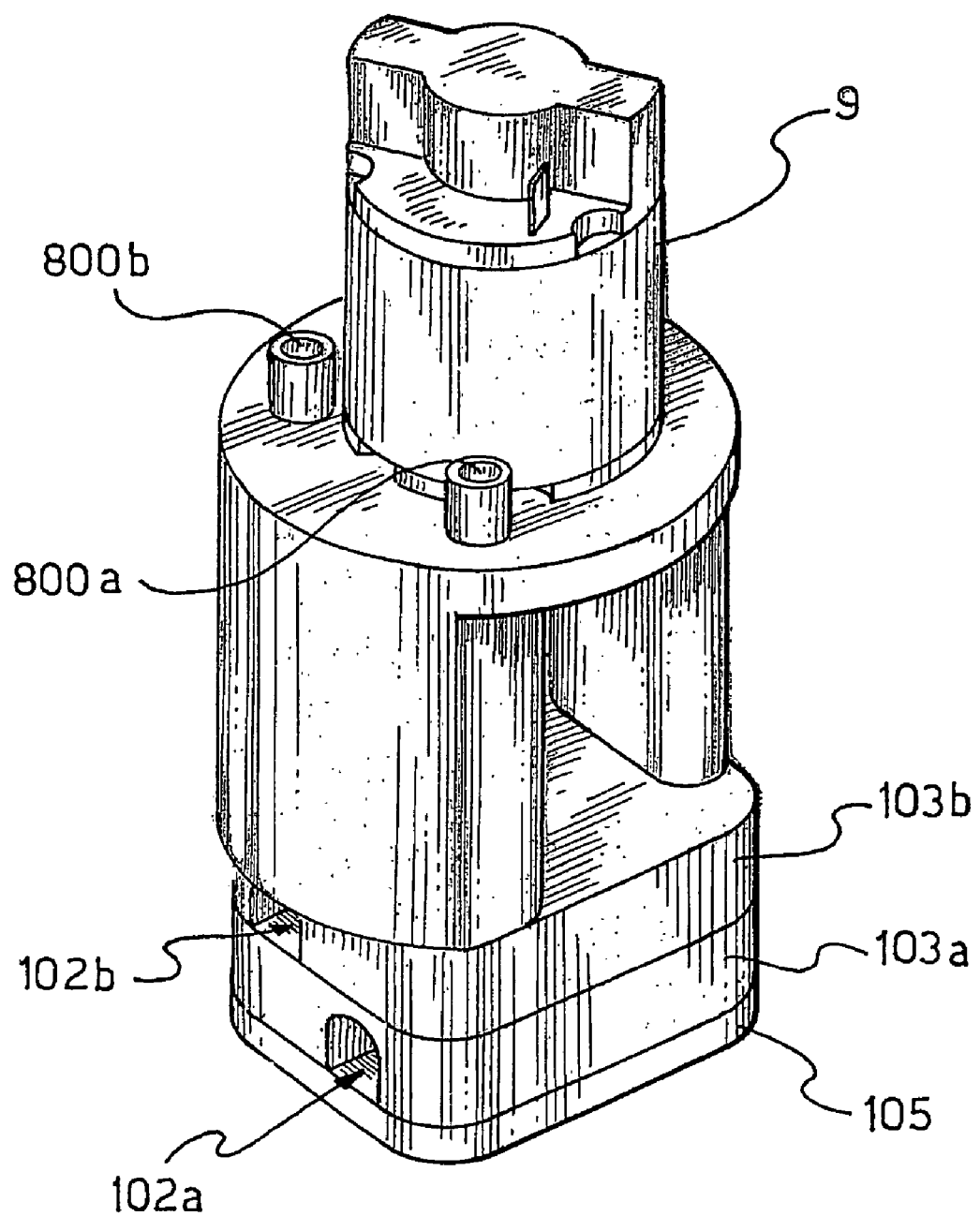
FIG. 3 shows a perspective view of a second embodiment of the supply device according to the present invention.
Figure 4:
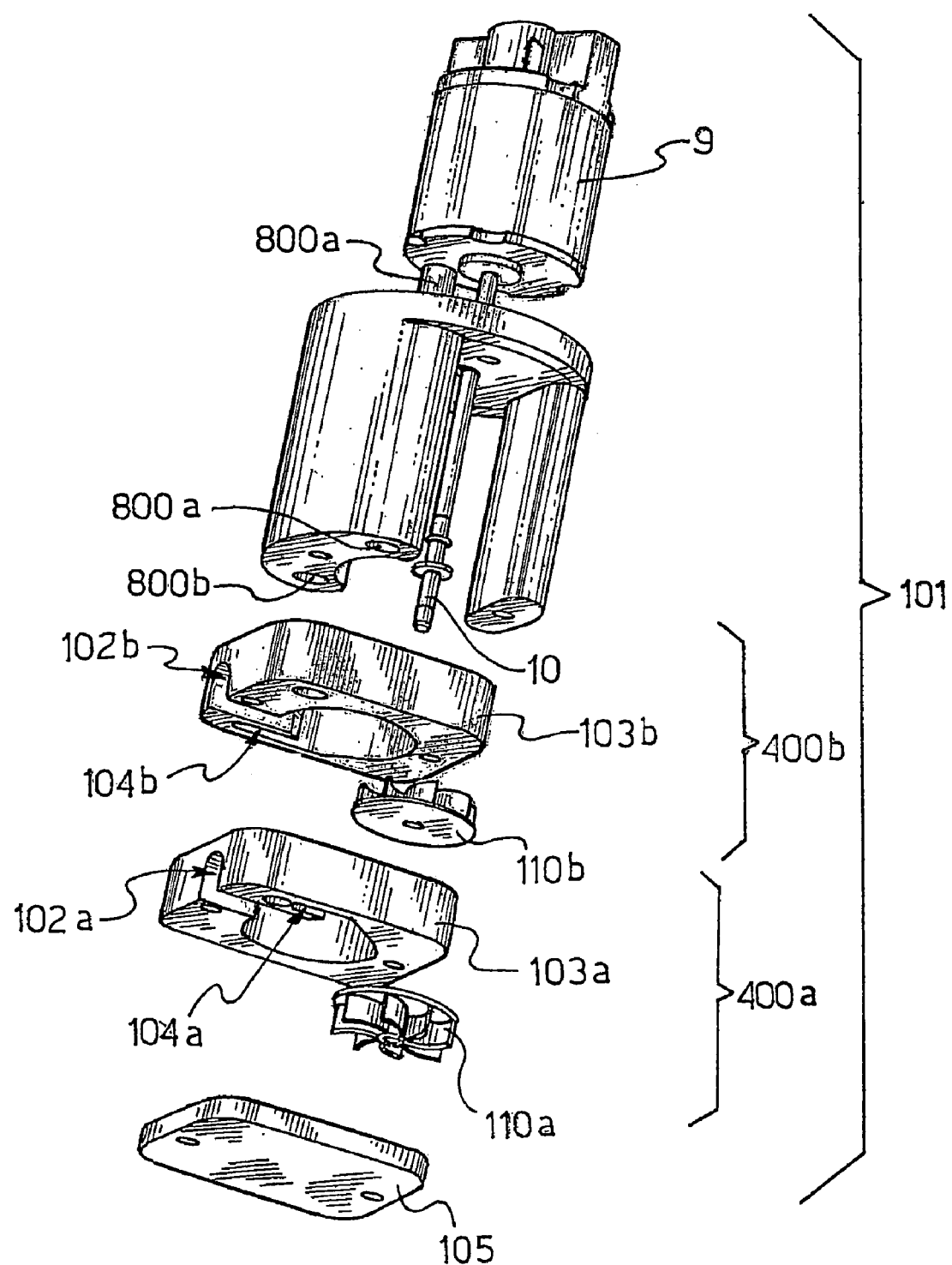
FIG. 4 shows a view from below of the devices involved in the second embodiment.

Referring now to FIGS. 3-4, which show the second embodiment of the present invention and where the elements described previously are assigned the same number, a pumping group 101 can be seen comprising a plurality of pumps 4a and 4b.

In particular, said pumps 4a and 4b are arranged together as one piece since they are connected to a single electric motor 9, which transfers motion to corresponding impellers 11a and 11b through motion transmission means 10.

Said impellers 11a and 11b are housed each in a box-shaped shell 103, preferably shaped as a parallelepiped, working as a stator.

Each shell 103 contains openings 102 allowing the fluid contained in the tank 2 to get in once said impellers 11a and 11b are actuated.

Furthermore, each shell 102 is the starting point of the outlets pipes or ducts 8a-8b, which can lead liquid food contained in the tank 2 to the corresponding mixing devices 7a, . . . , 7f.

Advantageously, such intake ducts 8a-8b, 8c-8d and 8e-8f are arranged on the vertical tangent.

In particular, the shaft of the electric motor 9 is connected in direct drive with the motion transmission means 10, which are in direct drive on the shaft of the rotor of said motor 9.

The working of the device 1, which has been previously described in its main components, will now be described in its aspects of novelty.

Once the consumer acts upon a key of the keyboard 6 in order to obtain any of the drinks supplied by the vending machine through one of its mixing devices 7a, . . . , 7f, the control interface 5 activates the heating element 3 so as to heat up the product contained in the tank 2 to the desired temperature as fast as possible, and selects which electric pump 4a or 4b or 4c has to be activated and above all which direction of rotation has to be chosen for the selected pump, i.e. clockwise or anti-clockwise.

Supposing that the impeller 11a of the electric pump 4a is activated in clockwise direction of rotation, the outlet duct 8a is then activated and sends the content of the tank 2 to the mixing device 7a associated to said duct.

The rotary movement of the impeller 11a of the electric pump 4a immersed in the liquid of the tank 2 generates a vortex, which trails the liquid portions from the center of the rotation to the walls of the box-shaped body 12, which thanks to its shape leads said liquid portions into the inlet Ia of the outlet duct 8a.

Once the first drink selected has been supplied, in case the consumer pushes a different key with respect to the previous one, though connected to the same electric motor 9, the electronic interface 5 reverses the direction of rotation of the impeller 11a of the electric pump 4a, i.e. in this case anticlockwise, thus activating the intake duct 8b, which in the previous case was inactive, together with the mixing device 7b associated to said duct.

Advantageously, thanks to the possibility of reversing the direction of rotation of the electric motor 9, only one of the outlet ducts 8a-8b, 8c-8d and 8e-8f of the pumps 4a, . . . , 4c is activated, with the favorable consequence that only one impeller supplies two different mixing devices.

It is thus possible to manage several mixing devices and therefore to offer a greater variety of hot products to the consumer thanks to the presence of a reversible pump with intake ducts that can be selectively chosen.

With particular reference to the FIGS. 3 to 5, a different embodiment of a device for supplying liquids according to the present invention will now be described, which embodiment differs from the one previously described only in the pumping group 101 used.

The pumping group 101 comprises an electric motor 9 which through motion transmission means 10 can actuate a plurality of centrifugal pumps, in the example two pumps referred to with 400a and 400b.

In the preferred embodiment the aforesaid motion transmission means comprise a rotation shaft 10, which is connected in direct drive, or by means of a reduction gear box, with the electric motor 9 and on which are fitted the impellers 110a and 110b of the pumps 400a and 400b, respectively.

Each centrifugal pump 400a and 400b has its own impeller 110a and 110b, housed in its own box-shaped shell 103a and 103b, preferably a parallelepiped, acting as a stator for the pump.

As is evident from the figures, the centrifugal pumps 400a and 400b are coaxial one respect to the other, so as to be both driven by the same rotation shaft 10, and are placed adjacent to one another.

Both shells 103a and 103b have an open front end enabling the introduction of the corresponding impeller. Concerning this it should be pointed out that while the front end of a shell, the one referred to with 103a, is closed by a cover 105, the other shell, i.e. the one referred to with 103b in the figure, does not need any cover since its front end is closed thanks to the body of the other shell on which it leans.

Each shell 103a and 103b has its own intake opening 102a and 102b, which allows the fluid within the tank 2 to get into the pump.

Figure 5:
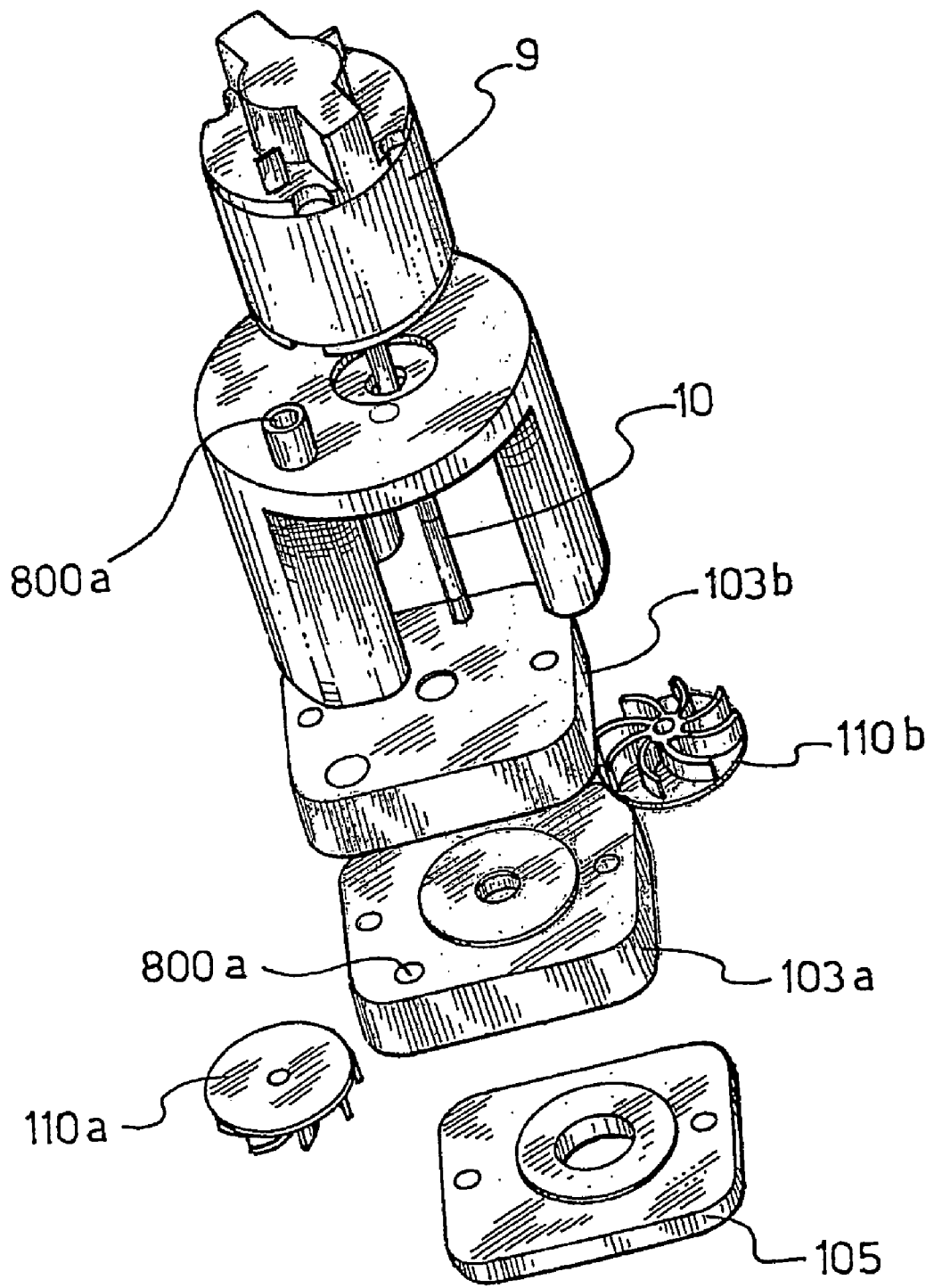
FIG. 5 shows a view from above of the devices involved in the second embodiment.

Furthermore, each shell 103a and 103b has its own duct 800a and 800b, which leads the liquid substances within the tank 2 to the corresponding mixing devices 7a, ..., 7f (not shown in FIGS. 3-5).

Advantageously, the intake ducts 800a and 800b extend within the pumping group in a vertical direction parallel to the rotation shaft 10, and are supplied by means of a corresponding intake plug 104a and 104b obtained in the corresponding shell 103a and 103b.

Obviously, said intake plugs 104a and 104b as well as the openings 102a and 102b are offset one with respect to the other so as not to interfere, as can be inferred from FIGS. 4 and 5.

In particular, referring again to FIGS. 4 and 5, it can be noticed how the intake duct 800b originates from the intake plug 104b of the shell 103b, whereas the intake duct 800a originates from the shell 103a on the intake plug 104a. The intake duct 800a gets through the shell 103a as far as the mixing device 7a.

It should be noticed that in the present embodiments the fins of the impellers 110a and 110b are shaped so as to enable the generation of a vortex only when said impellers are driven in the same direction of rotation.

Advantageously, the aforesaid impellers are housed in their own shell so as to be upside down one with respect to the other. As a consequence, a rotation in a certain direction (for instance clockwise) of the rotation shaft 10 results in the rotation of both impellers 110a and 110b, but only one of both impellers (impeller 110a) can generate a vortex in its own shell allowing to lead fluid into the corresponding intake duct (intake duct 800a). In the same way, by inverting the direction of rotation of the rotation shaft 10 (anti-clockwise) only the other impeller (impeller 110b) can generate in its own shell a vortex allowing to lead fluid into the corresponding intake duct (intake duct 800b).

In short, the structure of the pumping group 101 enables to send fluid to an intake duct or to the other one selectively according to the direction of rotation given to the drive shaft 10 by the electric motor 9, i.e. to the direction of rotation given to both impellers 110a and 100b. Indeed, both impellers 110 and 110b are forced to turn in the same direction, but, as was said before, this results in an impeller generating in its own shell a vortex allowing to lead fluid to a corresponding intake duct, whereas the other impeller cannot create in its own intake duct such a discharge head to lead the fluid to the corresponding intake duct.

Advantageously, each intake plug 104a and 104b is oriented with respect to the corresponding shell 103a and 103b in a non-perpendicular, preferably tangential, direction promoting the receipt of the intake flow resulting from the vortex generated by the corresponding impeller 110a and 110b in the shell.

Moreover, this allows to solve the problem resulting from limestone scales on the seal, since the diameters of discharge ducts are greater than those in known systems, thus avoiding the deposit and therefore the formation of limestone.

Eventually, the device such as described can advantageously be carried out with lower costs.

Obviously, in order to meet urgent and specific needs, a person skilled in the art can make several changes and variants to the device as described above, all of which are included in the protection field of the invention as defined by the following claims.

The invention claimed is:

1. A device for supplying liquids in vending machines for food or drinks, the device being valveless and comprising a heating arrangement (3) for heating up said liquids and an electric drive pumping group (4; 101), characterized in that each pump of said pumping group (4; 101) has an intake (4'; 102a, 102b), at least a first and a second vertical output duct (8a-8b, 8c-8d, 8e-8f; 800a, 800b) for conveying liquids contained in a tank (2) to corresponding mixing devices (7a, ..., 7F each being equipped with at least an impeller (11a, ..., 11c, 110a, 110b), housed in a shell (12, 103) having an open bottom and a curved side wall (12a), said first and second output ducts (8a-8b, 8c-8d, 8e-8f) each having an intake (Ia-Ib, Ic-Id, Ie-If) arranged on a vertical tangent of the curved side wall 12a) of said shell (12, 103), the output ducts being selectively activated according to the direction of rotation of said at least one impeller (11a, ..., 11e) in said pumping group (4, 101) and the intakes (Ia-Ie) and vertical outlet ducts being valveless and unobstructed.

2. The device according to claim 1, characterized in that said pumping groups (4) each comprise at least a pump (4a, 4b, 4c) equipped with said at least one impeller (11a, 11b, 11c).

3. The device according to claim 2, characterized in that said at least one pump (4a, ..., 4c) is a centrifugal pump, in that said at least one impeller (11a, ..., 11c) is housed within a chamber defined by a shell (12, 103) and in that:
said first intakes (Ia, Ic, Ie) output ducts (8a, 8c, 8e) are oriented with respect to the curved side wall (12) of the shell (12) in a non-perpendicular direction, so as in receive the intake flow when said impeller (11a, 11b, 11c) has a first direction of rotation, and
said second intakes of the vertical output ducts (8b, 8d, 8f) are oriented with respect to the curved side wall (12a) of the shell (12, 103) in a non-perpendicular direction, so as to receive an intake flow (11a, 11b, 11c) when the impeller (11a, 11b, 11c) has an opposite direction of rotation with respect to said first direction of rotation.

4. The device according to claim 3, in which said shell (12, 103) is substantially shaped as a round box and said first intakes (Ia, Ic, Ie) of said first ducts (8a, 8c, 8e) and said second intakes (Ib, Id, If) of said second (8b, 8d, 8f) ducts are oriented in directions tangent to the curved side wall (12a) of the shell (12).

5. The device for supplying food according to claim 2, characterized in that said at least one pump (4a, 4c) comprises an electric motor (9) connected to said at least one impeller (11a, ..., 11c) through motion transmission means (10).

6. The device according to claim 1, in which said pumping group comprises two pumps (400a, 400b) driven by the same electric motor by means of motion transmission means (10), each pump comprising: an impeller (11a, 11b), an intake opening (102a, 102b) and at least an intake duct that can be activated only in a given direction of rotation of the impeller (110*a*, 110*b*), said two pumps (400*a*, 400*b*) having opposite directions of rotation for the activation of the corresponding intake duct.

7. The device for supplying food or drinks according to claim 3, characterized in that the direction of rotation of said at least one impeller (11*a*, ..., 11*c*, 110*a*, 110*b*) of said at least one pump (4*a*, ..., 4*c*, 400*a*, 400*b*) is operatively driven by an electronic interface (5) in accordance with signals sent to said electronic interface (5) from a selection keyboard (6).

8. The device for supplying food or drinks according to claim 3, characterized in that said at least first and second output ducts (8*a*-8*b*, 8*c*-8*d*, 8*e*-8*f*, 800*a*, 800*b*) are each in fluid connection with at least a mixing device (7*a*, ..., 7*f*).

9. The device for supplying food or drinks according to claim 8, characterized in that said at least one mixing device (7*a*, ... 7*f*) is also in fluid connection with an intake duct (13*a*, ..., 13*f*) supplying said at least one mixing device (7*a*, ..., 11*f*) with soluble products.

10. The device for supplying food or drinks according to claim 5, characterized in that said electric motor (9) is controlled by said electronic interface (5).

11. The device for supplying food according to claim 5, characterized in that said motion transmission means (10) comprises a drive shaft.

12. The device of claim 1 wherein the curved side wall (12*a*) of the shell (12) is circular with the inlets Ia, Ic, Ie) of one of the outlet ducts (8*a*, 8*c*, 8*e*) being tangential in a first direction and the inlets (Ib, Id, If) of the other outlet ducts (8*b*, Id, If) being tangential in a second direction, whereby as the impellers rotate (11*a*-11*e*) inlets (Ib, Id, Ie) in a fist direction heated water flows into the first vertical outlet ducts (8*a*, 8*c*, 8*e*) and when the impellers (11*a*-11*f*) rotate in the second direction hot water flows into the other vertical outlet ducts (8*b*, 8*d*, 8*f*).

13. A device for supplying liquids to vending machines for heated food or drinks comprising:
   a tank for containing liquid;
   a heater in the tank;
   at least one pump in the tank; the pump having a housing arrangement with at least one impeller therein driven by a reversable motor that can Mate the impeller in opposite directions;
   first and second unobstructed, valveless intakes associated with the housing arrangement the first intake being tangentially positioned on the curved vertical wall of the housing at a first location and the second intake being tangentially position on the curved vertical wall of the housing at a second location angularly removed from the first location by an angle sufficient to prevent displacement of liquid loin the housing which the impeller is rotating clockwise and allowing displacement of liquid horn the container when the impeller is rotating counter clockwise;
   the first and second intakes being connected by first and second vertically extending valveless and unobstructed outlet ducts to mixing devices for mixing the liquid with first and second additives to make first and second heated drinks, and
   a motor controller for rotating the impeller in opposite directions to select first or second heated food or drinks.

14. The device of claim 13 wherein there are a plurality of pumps, each having first and second intakes, and located in the tank for supplying more than two mixing devices to make more than two foods or drinks.

15. The device of claim 13 wherein the housing comprises vertically stacked first and second chambers each having an impeller, the impellers being driven by the same shaft that is rotated in opposite directions by the reversible motor to select the first or second outlet duct;
   the first and second inlets for the connection to the first and second vertical outlet ducts being in the first and second chambers respectively and the first and second inlets opening to the tank for taking liquid from the tank.

* * * * *

UNITED STATES PATENT AND TRADEMARK OFFICE
CERTIFICATE OF CORRECTION

| | |
|---|---|
| PATENT NO. | : 7,624,896 B2 |
| APPLICATION NO. | : 10/535107 |
| DATED | : December 1, 2009 |
| INVENTOR(S) | : Doglioni Majer |

It is certified that error appears in the above-identified patent and that said Letters Patent is hereby corrected as shown below:

Column 8 reads "shell (12) in a non-perpendicular direction, so as in" should read -- shell (12) in a non-perpendicular direction, so as to --.

Column 9 reads "11 *f*) with soluble products." should read -- 7*f*) with soluble products. --.

Column 10, line 4 reads "a reversable motor that can Mate the impeller in opposite" should read -- a reversable motor that can rotate the impeller in opposite --.

Column 10, line 13 reads "ment of liquid loin the housing which the impeller is" should read -- ment of liquid from the housing which the impeller is --.

Column 10, line 15 reads "horn the container when the impeller is rotating counter" should read -- from the container when the impeller is rotating counter --.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,624,896 B2　　　　　　　　　　　　　　　　　　　　　　　　Page 1 of 1
APPLICATION NO. : 10/535107
DATED : December 1, 2009
INVENTOR(S) : Andrea Doglioni Majer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 901 days.

Signed and Sealed this

Twenty-sixth Day of October, 2010

David J. Kappos
*Director of the United States Patent and Trademark Office*